No. 871,892. PATENTED NOV. 26, 1907.
W. T. RUSSELL.
TOOL HOLDER FOR LATHES.
APPLICATION FILED MAR. 23, 1907.
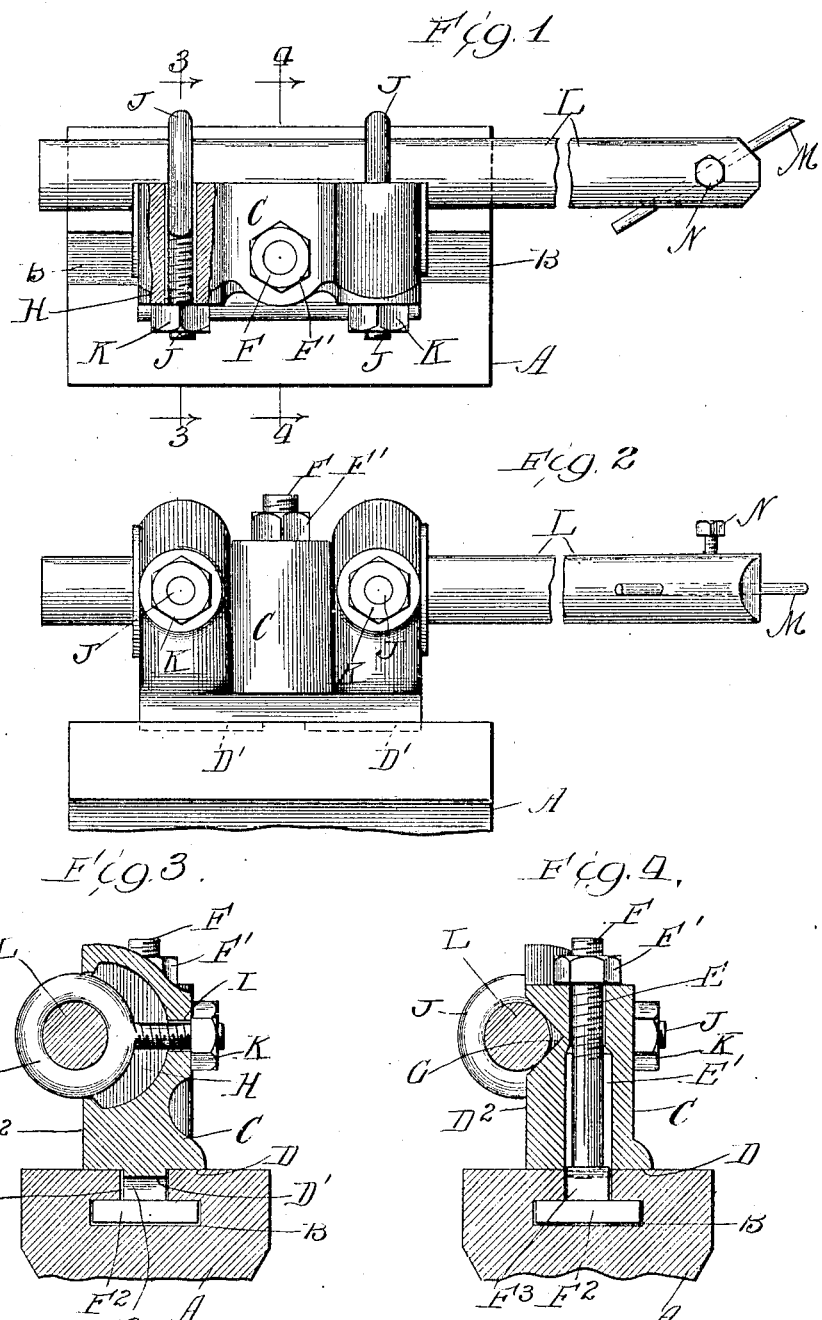
Witnesses:
Ray White
Harry R. L. White
Inventor
William T. Russell,
By Morgan & Rubinstein
Attys

UNITED STATES PATENT OFFICE.

WILLIAM T. RUSSELL, OF CHICAGO, ILLINOIS.

TOOL-HOLDER FOR LATHES.

No. 871,892.  Specification of Letters Patent.  Patented Nov. 26, 1907.

Application filed March 23, 1907. Serial No. 364,031.

*To all whom it may concern:*

Be it known that I, WILLIAM T. RUSSELL, a citizen of the United States, residing at 1801 West End avenue, in the city of Chicago, in the county of Cook and State of Illinois, have invented a new and useful Improvement in Tool-Holders for Lathes, of which the following is a specification.

My invention relates to that class of tools adapted to be secured on the slide rest of a lathe in place of the ordinary tool post.

The object of my invention is, to provide a tool holder to be used in connection with the slide rest of a lathe, which is adapted to hold a greater variety of tools for lathe work than is possible with the tool holders in common use; that affords a better and wider range of adjustment of the tools and in which various tools and parts of machines and other articles of manufacture can be held while operated upon by drills, or other cutting devices secured in the lathe.

The manner in which I accomplish my object is described in the following specification and illustrated in the accompanying drawing, in which:—

Figure 1, is a top plan view with part broken away, Fig. 2 is a front elevation, Fig. 3 is a vertical cross section on the line 3—3, Fig. 1. Fig. 4 is a vertical cross section on the line 4—4 Fig. 1.

In the drawings A indicates the top part of a revoluble head of a slide rest.

B is a slot in the head A, adapted to receive the tool holder.

C is the main body of the tool holder. The base D of this body is adapted to rest on the head A. The projection $D^1$ is adapted to form a sliding fit in the narrow part of the slot B. This projection extends from near the vertical center line of the main body, longitudinally each way therefrom the full length of said body, which is thereby prevented from being rotated on said head. Extending vertically through the center of the body C is an aperture E, which is slightly enlarged at the lower part $E^1$. Extending through this aperture is a screw bolt F. The upper end of this bolt is threaded and provided with a nut $F^1$. The other end of the bolt is provided with a head $F^2$. This head in form is an oblong rectangular, adapted in size to fit and slide freely in the undercut part of the slot B. The neck $F^3$ of said bolt is adapted in size to fit the narrow part of said slot as shown in Fig. 4. In the vertical face $D^2$, of the body C, is a horizontal V shaped tool groove G. At right angles to this groove and extending from it into the body C, are two apertures H extending at I through said body horizontally as shown in Fig. 3. Each of these apertures is adapted to support an eye bolt J, which is adjustably secured in said body by a nut K.

When my invention is constructed as described and illustrated, its adjustment and operation is as follows. The nut $F^1$ on the bolt F is slacked up to allow the head $F^2$ and projection $D^1$ to be slipped into the slot B in the slide rest head A. When the main body C is adjusted in place on said head the nut $F^1$ is screwed down firmly on to the body C which is thereby firmly secured on the slide rest head A. The nuts K on the eye bolts J are slacked up to allow the tool or cutter bar L to be inserted in the eye bolts. When the tool is adjusted therein, the nuts K are screwed up tight and the tool is thereby drawn into the tool groove G, and is ready for use.

It is obvious that the eye bolts may be varied in form both in the apertures therein and in outline, and that the apertures H in the main body may be adapted in shape to correspond with the shape of the eye bolts; and that the variations in the interior shape of the eye bolts would correspond with the shape of the tools or articles to be held by my device. I therefore do not limit myself to the form of eye bolts shown which are adapted to hold the round bar shown.

What I claim and desire to secure by Letters Patent is:

1. In a tool holder of the kind described, the combination consisting of a head or main body adapted to rest on and to be secured to a lathe slide rest, having a recess in its face and an aperture extending horizontally therefrom through said head, and a groove extending across said face parallel with the base of said head and in the same plane as the axis of said aperture; a threaded eye bolt insertible in said recess and aperture, the rear part of the head of said bolt fitting into said recess so as to prevent all vertical, lateral and rotary movement of said bolt, the center of the eye of said bolt corresponding with the center line of said groove in said head, the threaded part of said bolt extending through and fitting said aperture in said head, and a nut on said threaded part adapted to engage the rear of said head and to adjust said bolt horizontally therein as described.

2. In a tool holder of the kind described, the combination consisting of a head adapted to be secured on the head of a lathe slide rest, having parallel recesses in its face, and parallel apertures extending horizontally from said recesses through said head, and a groove across said face parallel with the base of said head in the same plane as the axis of said apertures, threaded eye bolts insertible in said recesses and apertures, the heads of said bolts fitting into said recesses so as to prevent all vertical, lateral and rotary movements of said bolts, the center of the eyes of said bolts corresponding with the center line of said groove in said head, the threaded part of said bolts fitting and extending through said apertures; a nut on the threaded part of each of said bolts adapted to engage the rear part of said head and to adjust said bolts horizontally therein as described.

WILLIAM T. RUSSELL.

Witnesses:
  JOSEPH STAAB,
  JULIUS RUBINSTEIN.